Figure 1:

United States Patent [19]
Gammon et al.

[11] 3,879,363
[45] Apr. 22, 1975

[54] POLYMERISATION PROCESS

[75] Inventors: Geoffrey James Gammon, Wenvoe, Wales; Phillip Lewis Addleston, Nr. Weybridge, England

[73] Assignee: BP Chemical International Limited, London, England

[22] Filed: July 5, 1972

[21] Appl. No.: 269,171

[30] Foreign Application Priority Data
July 5, 1971 United Kingdom............... 31392/71

[52] U.S. Cl.......... 260/92.8 W; 260/86.3; 260/87.1; 260/87.5; 260/88.2
[51] Int. Cl. .............................................. C08f 1/11
[58] Field of Search ................. 260/92.8 R, 92.8 W

[56] References Cited
UNITED STATES PATENTS

| | | | |
|---|---|---|---|
| 3,205,204 | 9/1965 | Heckmaier et al. ............... | 260/87.1 |
| 3,592,801 | 7/1971 | Ilavsky et al...................... | 260/88.2 |
| 3,663,482 | 5/1972 | Gammon........................... | 260/17 R |
| 3,725,375 | 4/1973 | Sturt .............................. | 260/92.8 W |

FOREIGN PATENTS OR APPLICATIONS
1,133,328  11/1968  United Kingdom

OTHER PUBLICATIONS

Kirk-Othmer, Vol. 19, 2nd Ed., Encyclopedia of Chem. Tech., 1969, pp. 564–566.

*Primary Examiner*—Joseph L. Schofer
*Assistant Examiner*—John Kight, III
*Attorney, Agent, or Firm*—Brooks Haidt & Haffner

[57] ABSTRACT

A process for the suspension polymerisation of olefinically unsaturated monomers and particularly vinyl chloride using an insoluble inorganic suspending agent and an amphoteric surfactant.

10 Claims, 4 Drawing Figures

POLYMERISATION PROCESS

This invention relates to improvements in or relating to polymerisation and copolymerisation of olefinically unsaturated compounds in aqueous dispersion.

Processes for the polymerisation of olefinically unsaturated compounds in aqueous dispersion are known. Such processes generally employ dispersion agents and wetting agents in addition to polymerisation initiators of the free radical type.

The product formed in an aqueous dispersion polymerisation process is produced as fine particles. It is the function of the dispersion agent to maintain the polymerising monomer in dispersion, to prevent or reduce the tendency of polymer particles to agglomerate and to control particle form.

Conventional dispersion agents used in the aqueous dispersion polymerisation and copolymerisation of olefincially unsaturated monomers are either organic water soluble polymeric materials, which include cellulose ethers e.g. methyl cellulose, hydroxyethyl cellulose, hydroxypropyl methyl cellulose, ethylhydroxyethyl cellulose and such compounds as polyvinyl acohol, gelatin, agar-agar, starch, partially hydrolysed polyvinyl acetates and copolymerisation products based on maleic anhydride or maleic acid, or insoluble inorganic compounds, e.g. metal phosphates.

Similarly many extenders are known. It is the function of an extender to aid or enhance the dispersion properties of the dispersion agents. Known extenders include anionic surface active agents such as sodium caproate and sodium oleate and metal derivatives of organic sulphates and sulphonates, such as long chain alkyl sulphates and sulphonates.

Aqueous dispersion polymerisation processes employing conventional dispersion agents for vinyl halides, produce the polymer in the form of fine particles. When a thin section of such a PVC particle is viewed by phase contrast microscopy, a "pericellular membrane" or external "skin" is seen. An indication of the amount of "skin" present is given by the rate of plasticiser uptake in an appropriate mixing test. Generally, the faster the rate of uptake, the less "skin" is present.

It is believed that this external membrane around each suspension polymer particle has a deleterious effect on other polymer properties. Vinyl chloride based polymers which are free from this membrane, e.g. polymers from mass polymerisation processes, generally show a more uniformly porous structure, higher purity, an improved transparency in moulded articles compared with polymers produced by conventional suspension processes.

An object of the present invention is to provide an improved dispersion process for the production of olefinically unsaturated compounds.

Accordingly, the present invention is a process for the aqueous dispersion polymerisation or copolymerisation of an olefinically unsaturated compound which comprises polymerising the monomeric material in aqueous dispersion in the presence of a free radical initiator and a dispersion stabiliser comprising an insoluble inorganic phosphate dispersion agent and an amphoteric surfactant.

Any polymerisable olefinically unsaturated compound can be employed in the process of the present invention. Suitable monomers are vinyl monomers such as styrene or a vinyl halide. The process is particularly suited for the polymerisation and copolymerisation of vinyl chloride as it can reduce "skin" formation.

Sufficient water should be present to provide a continuous phase for the monomer to be dispersed therein. Preferably the monomer to water weight ratio is in the range from 1:1 to 1:2.5 for vinyl chloride or 1:1 to 2:1 for styrene.

Examples of other olefinically unsaturated compounds include, but are not restricted to, ethylene, propylene, 1,2-dichloro-ethylene, vinylidene chloride, vinyl acetate, vinyl laurate, vinyl stearate, alkyl vinyl ethers, acrylic acid esters and substituted acrylic acid esters. These compounds may also be copolymerised among themselves or may be used as comonomers with vinyl chloride or with styrene preferably in a proportion of less than 30% of the total copolymerising mixture.

Suitable initiators include lauroyl peroxide, caprylyl peroxide, benzoyl peroxide, teriary butyl peroxypivalate and 2 azo bisisobutyronitrile; peroxydicarbonates such as ditertiarybutyl-cyclohexylperoxydicarbonate, diethylperoxydicarbonate, dicyclo-hexylperoxydicarbonate and diisopropyl peroxydicarbonate. Other suitable initiators include those which are formed in situ, that is, in the polymerisation medium, e.g. the initiator formed by the reaction of a chloroformate ester such as ethylchloroformate or isopropylchloroformate and hydrogen peroxide under alkaline conditions.

The proportion of initiator used in the polymerisation process of the present invention is similar to that used in conventional aqueous dispersion polymerisation processes.

Dispersing agents which are suitably used in the process of the present invention include insoluble inorganic phosphates such as calcium, strontium, barium, magnesium aluminium and zinc phosphates. Particularly suitable are phosphates having an apatite structure, e.g., the hydroxyapatites. Hydroxy-apatite (calcium hydroxy phosphate) is particularly preferred.

The amount of the inorganic phosphate dispersing agent employed may be in the range of 0.01% to 1% by weight on the monomeric material. The preferred amount will depend on the monomers used and the monomeric material to water phase ratio. For vinyl chloride used with a monomer to water phase ratio in the range 1:1.6 to 1:2 by weight the amount may be in the range of 0.1% to 0.3% by weight on monomer.

The inorganic phosphate suspending agents are conveniently prepared in an aqueous medium by the double decomposition of water soluble salts, or alternatively by treating the appropriate metal base (e.g. oxide or hydroxide) with orthophosphoric acid. Examples of suitable water soluble salts containing the required cation are calcium chloride, calcium acetate and calcium nitrate. Suitable water soluble salts containing the required phosphate anion are for example alkali metal phosphates, such as trisodium orthophosphate. The composition and particle size of the inorganic phosphate suspending agent is determined to some extent by the pH at which it is formed. Preferably the precipitation is carried out when the pH is in the range 11.0 to 5.0, preferably 8.0 to 5.5. It is sometimes advantageous to use "a pH adjuster" to control the pH during the precipitation, an example of a suitable "pH adjuster" being disodium hydrogen phosphate dodecahydrate ($Na_2HPO_4.12H_2O$) ut other "pH adjusters" may be used.

The temperature at which the inorganic phosphate suspending agents are formed controls their composition and particle size. A wide range of temperatures can be employed for the precipitation, e.g. it can be carried out when the aqueous medium is at a temperature in the range 15°C to 95°C, and preferably at 75°C to 90°C. The monomeric material and the surfactant may be present or absent during the formation of the inorganic phosphate suspending agent. It is generally advantageous to have the surfactant present during the formation of the inorganic phosphate.

Suitable amphoteric surfactants are those of general formula

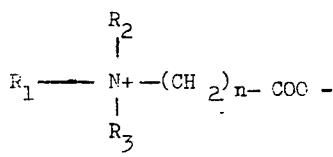

where $R_1$, $R_2$, and $R_3$ are alkyl, aryl or alkaryl radicals and $n$ is an integer equal to or greater than 1. Particularly preferred is dodecyl/myristyl betaine, where $R_1$ is a mixture of myristyl- and dodecyl- and $R_2$ and $R_3$ methyl groups; and hexadecyl octadecyl betaine (where $n = 1$ in both cases).

The concentration of amphoteric surfactant used in the process of the present invention may be in the range of 0.0001% to 0.2% by weight on the monomeric material. The preferred amount will depend on the monomer(s) and the monomeric material to water phase ratio. For vinyl chloride at a 1.6:1 to 2:1 water to monomer weight phase ratio the preferred range is from 0.001% to 0.5%, most preferably .002 to .05% by weight based on the weight of monomeric material used.

The elimination of organic colloid from the suspension system helps to avoid the formation of "skin." However, a minor amount of colloid (less than 50% by weight of the total suspending agent) may be included in the system of the present invention if desired, particularly when added after the start of polymerisation. Suitably, not more than 0.06% by weight on monomeric material may be used.

The pH of the polymerisation medium should normally be maintained within the range from 9.0 to 5.0 pH units throughout the polymerisation by the presence of a suitable "pH adjuster" (for example disodium hydrogen phosphate).

The polymerisation temperature may be conventional and is suitably within the range from 5°C to 150°C and preferably in the range of 40°C to 70°C for vinyl chloride polymerisation. Super atmospheric pressures are employed as necessary to maintain the desired liquid phases.

Conventional suspension polymerisation reaction conditions and apparatus can be used, and other materials e.g. stearic acid or molecular weight modifiers such as trichloroethylene may be added to the polymerisation mixture.

The polymeric products obtained from the process of the present invention are optionally given a wash with water or dilute acid before undergoing the usual drying procedures to give products of improved transparency compared with conventional suspension resins.

It is generally found that using the amphoteric surfactants of the present invention compared with anionic or nonionic surfactants in vinyl chloride suspension polymerisation reduces reactor fouling and gives improved powder properties (particularly dry blending performance).

The invention is illustrated by the following examples:

EXAMPLE 1

Preparation of Inorganic Phosphate Suspending Agent

Lime (0.19 parts) was dispersed in distilled water (14 parts) and the agitated dispersion was heated to 90°C. A solution of orthophosphoric acid (0.17 parts of 88% w/v) in water (1.8 parts) as added slowly over a period of 30 seconds with vigorous agitation. The stirring was continued for a further 5 minutes at 90°C, after which time the calcium phosphate slurry was cooled rapidly to room temperature with moderate agitation.

Suspension Polymerisation

Distilled water (150 parts) was charged to a polymerisation reactor, and the dispersion of the inorganic phosphate suspending agent (0.25 parts prepared as described above) was added while stirring. Dodecyl/myristyl betain (0.17 parts of 30% weight solution) (equivalent to 0.05 phm active material) was added and the dispersion was stirred for 2 minutes. Ditertiary butyl cyclohexyl peroxydicarbonate initiator (0.10 parts) was then added and the reaction vessel was charged with vinyl chloride monomer (100 parts). The reaction mixture was heated to 54°C and was maintained at this temperature for 4.5 hours to complete the polymerisation.

The product was shown by phase contrast microscopic and scanning electron microscopic examination of the PVC particles to be free from pericellular "skin."

Further details are given in Table 1.

EXAMPLES 2 and 4

The procedure was the same as for Example 1 except that the dodecyl/myristyl betaine level was varied as indicated in Table 1.

EXAMPLES 5 and 6

These polymerisations were carried out with an inorganic phosphate suspending agent level of 0.125 phm. Experimental details and product properties are given in Table 1.

EXAMPLE 7

Trisodium phosphate dodecahydrate (0.33 parts) disodium hydrogen phosphate dodecehydrate (0.20 parts), dodecyl/myristy 1 betain (0.013 of a 30% active solution) and distilled water (100 parts) were charged to a polymerisation reactor, fitted with a stirrer running at 400 rpm. The mixture was agitated for 5 minutes, after which time styrene monomer (100 parts) was added and the contents were heated to 75°C. Calcium chloride flake (0.27 parts) was added and the suspension was heated 90°C. Benzoyl peroxide (0.30 parts) was added and the suspension was agitated at 90°C for 23 1 hours.

The polystyrene product (in bead form) thus obtained was isolated and the bead size distribution and specific viscosity were determined.

EXAMPLES 8 and 9

The procedures were identical to those described in Example 7 except that a different level of dodecyl/myristyl betaine was used, as indicated in Table 2.

TABLE I

VINYL CHLORIDE POLYMERISATION USING INORGANIC PHOSPHATE/AMPHOTERIC SURFACTANT SUSPENSION SYSTEMS

| Example No | Inorganic Phosphate Suspending Agent phm | Dodecyl/myristyl Betaine Level phm | Ditertiary butyl/cyclo hexyl peroxy-dicarbonate phm | Reaction Time h | Bulk Density g/cm3 | Specific Viscosity* | DOP Uptake % wt |
|---|---|---|---|---|---|---|---|
| 1 | 0.25 | 0.050 | 0.10 | 4.5 | 0.46 | 0.65 | ND |
| 2 | 0.25 | 0.040 | 0.10 | 5.2 | 0.40 | 0.67 | 43 |
| 3 | 0.25 | 0.035 | 0.10 | 5.4 | 0.40 | 0.65 | 41 |
| 4 | 0.25 | 0.025 | 0.10 | 5.0 | 0.49 | 0.67 | 42 |
| 5 | 0.125 | 0.025 | 0.10 | 4.5 | ND | 0.66 | ND |
| 6 | 0.125 | 0.018 | 0.10 | 5.0 | 0.53 | 0.65 | 31 |

*Measured on a 0.5 per cent weight solution in cyclohexanone

TABLE 2

STYRENE POLYMERISATION USING AN INORGANIC PHOSPHATE/AMPHOTERIC SURFACTANT SUSPENSION SYSTEM

| Example No. | Inorganic Phosphate Suspending Agent phm | Dodecyl/myri-styl betaine Level phm | Benzoyl Peroxide phm | Reaction Time h | Specific Viscosity | Bead Size Distribution, Retention on Different Mesh Sieve. British Standard Sieve No. | | | | | |
|---|---|---|---|---|---|---|---|---|---|---|---|
| | | | | | | 10 | 22 | 44 | 60 | 85 | >85 |
| 7 | 0.15 | 0.004 | 0.30 | 23 | 1.16 | 15.2 | 60.8 | 23.1 | 0.3 | 0.05 | — |
| 8 | 0.15 | 0.008 | 0.30 | 23 | 1.17 | 2.1 | 36.5 | 57.4 | 1.6 | 0.8 | 0.3 |
| 9 | 0.15 | 0.016 | 0.30 | 26 | 1.24 | 2.5 | 21.9 | 69.9 | 5.0 | 0.3 | 0.15 |

*Measured on a 1% wt solution of product in toluene.

Figure 2:

The invention is further illustrated by the accompanying photographic FIGS. 1 to 4. FIG. 1 shows the particles of the polymer of Example 4 magnified 200 times in a scanning electron microscope photograph. FIG. 2 shows suspension polymerised PVC made using a conventional organic colloid suspending agent also magnified 200 times.

Figure 3:
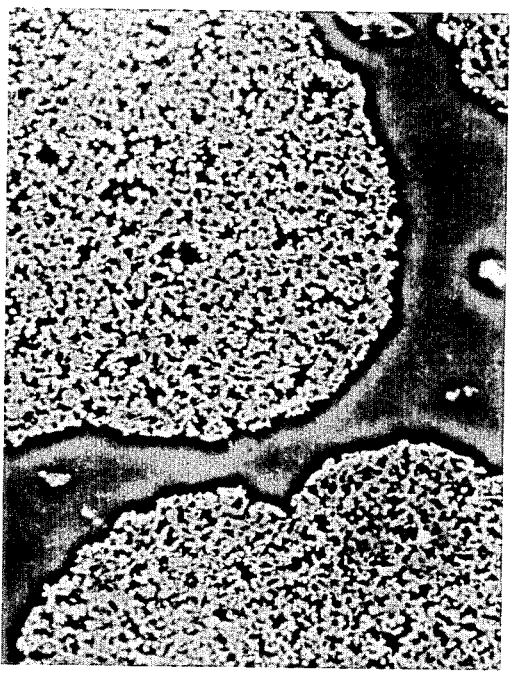
Figure 4:
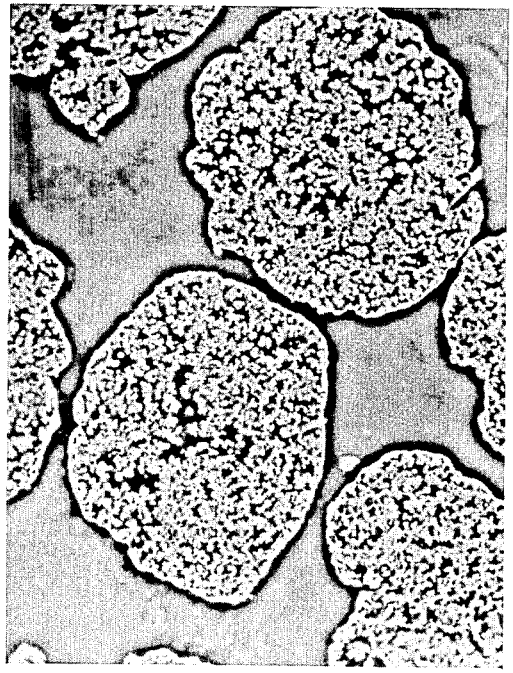

FIG. 3 shows a thin section of a particle of the polymer of Example 6, magnified 500 times by phase contrast microscopy while FIG. 4 shows a similar section, magnified 500 times, of the same suspension polymer as shown in FIG. 2.

The polymer particles of FIGS. 1 and 3 are clearly seen to be granular and free from "skin" whereas the polymer particles shown in FIGS. 2 and 4 can be seen to be coated in a surface "Skin".

EXAMPLE 10

Preparation of Inorganic Phosphate Suspending Agent

An agitated solution of trisodium phosphate dodecahydrate (0.36 parts) and dodecyl/myristyl betaine (0.017 parts of a 30% solution) in water was heated to 90°C and calcium chloride was added to bring the pH of the aqueous phase to ca PH 8 (i.e., ca 0.23 parts of Ca Cl 2H$_2$O). The aqueous dispersion was then allowed to cool to room temperature. Hydroxypropyl methyl cellulose (0.035 parts) in aqueous solution was then added to the mixture.

Suspension Polymerisation

The free radical initiator was added to the aqueous dispersion of the suspension system prepared above in the polymerisation vessel. The vessel was then charged with vinyl chloride monomer (100 parts) to give an overall monomer / water phase ratio of ca 1: 1.7 by weight. Polymerisation was carried out at 58°C to a blow down pressure of 60 psig.

The product was shown by scanning electron microscopic examination of individual PVC particles to possess a thin, but apparently continuous pericellular membrane coating. The product had a bulk density of 0.54g/cm$^3$ and a dryblending time of 5 minutes 9 seconds (for a 200 g. sample in a Planetary Head mixing test at 88°C).

Example 11

The procedure outlined for Example 10 was repeated except that 0.028 parts of hydroxypropyl methyl cellulose were present in the suspension polymerisation.

Scanning electron microscopic examination of this product indicated that only a small amount of "skin" was present and the surface of the PVC particles were non-uniformly covered by this membrane.

Bulk density and corresponding dryblending time for a sample of this essentially "skin" free product were 0.51g/cm$^3$ and 6 minutes and 15 seconds respectively.

Dryblending time for the corresponding (but commercially available) conventional mass and suspension polymers examined were 6 minutes 53 seconds and 8 minutes 26 seconds respectively.

We claim:

1. A process for the aqueous dispersion homopolymerisation or copolymerisation of a vinyl halide monomer which process comprises homopolymerising or copolymerising said monomeric material in aqueous dispersion in the presence of a free radical initiator and a dispersion stabiliser essentially consisting of an insoluble inorganic phosphate dispersion agent and an amphoteric surfactant of the general formula

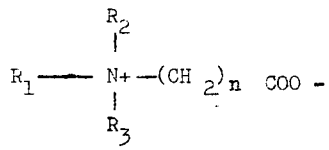

where $R_1$, $R_2$, and $R_3$ are alkyl, aryl or alkaryl radicals and $n$ is an integer equal to or greater than 1.

2. A process according to claim 1 where the vinyl monomer is vinyl chloride.

3. A process according to claim 1, wherein the insoluble inorganic phosphate is calcium, strontium, barium, magnesium, aluminium or zinc phosphate.

4. A process according to claim 3 wherein the insoluble inorganic phosphate has an apatite structure.

5. A process according to claim 1 wherein the amount of insoluble inorganic phosphate used is in the range of 0.01% to 1% by weight on monomeric material.

6. A process according to claim 1 wherein the insoluble inorganic phosphate is precipitated at a pH in the range 8.0 to 5.5.

7. A process according to claim 1 where $R_2$ and $R_3$ are methyl groups and $R_1$ is a mixture of myristyl and dodecyl or hexadecyl and octadecyl groups.

8. A process according to claim 1 wherein the concentration of amphoteric surfactant is in the range 0.0001% to 0.2% by weight on the monomeric material.

9. A process according to claim 1 wherein the monomer is vinyl chloride, the monomer to water phase ratio is in the range of 1: 1.6 to 1: 2 by weight and wherein from 0.001% to 0.05% by weight on the monomeric material of amphoteric surfactant is used.

10. A process according to claim 1 wherein an organic colloid is present in an amount up to 0.06% by weight on the monomeric material.

* * * * *

UNITED STATES PATENT OFFICE
CERTIFICATE OF CORRECTION

PATENT NO. : 3,879,363
DATED : April 22, 1975
INVENTOR(S) : GEOFFREY JAMES GAMMON and PHILLIP LEWIS ADDLESTON It is certified that error appears in the above—identified patent and that said Letters Patent are hereby corrected as shown below:

Col. 4, line 65, change "23 1 hours" to --23 hours--

Signed and Sealed this nineteenth Day of August 1975

[SEAL]

Attest:

RUTH C. MASON
Attesting Officer

C. MARSHALL DANN
Commissioner of Patents and Trademarks